United States Patent [19]
Masson

[11] Patent Number: 5,540,189
[45] Date of Patent: Jul. 30, 1996

[54] THERMALLY INSULATED CALF EAR PROTECTORS

[76] Inventor: Sharlene C. Masson, Box 347, Ste. Rose Du Lac Manitoba, Canada, R0L 1S0

[21] Appl. No.: 385,692

[22] Filed: Feb. 8, 1995

[30] Foreign Application Priority Data

Feb. 10, 1994 [CA] Canada .................................. 2115419

[51] Int. Cl.⁶ ................................................ A01K 13/00
[52] U.S. Cl. ............................................ 119/850; 119/814
[58] Field of Search ........................... 119/814, 850; 54/79.1, 79.2, 79.3, 79.4, 80.1, 80.2, 80.4, 80.5

[56] References Cited

U.S. PATENT DOCUMENTS

| | | | |
|---|---|---|---|
| 669,909 | 3/1901 | Young | 119/850 |
| 2,136,115 | 11/1938 | Mc Caleb | 119/850 |
| 3,753,334 | 8/1973 | Blessing | 119/850 |
| 4,221,189 | 9/1980 | Olvera | 119/814 |
| 4,233,942 | 11/1980 | Williams | 119/814 |
| 4,964,264 | 10/1990 | Adams | 119/850 |
| 5,163,272 | 11/1992 | Finley et al. | 54/80.1 |
| 5,321,937 | 6/1994 | Hamilton | 54/80.2 |

*Primary Examiner*—Todd E. Manahan
*Attorney, Agent, or Firm*—Murray E. Thrift; Adrian D. Battison

[57] ABSTRACT

An animal ear protector has a pair of ear pockets joined by an elastic crown strap that extends across the back of the animal's head. An elastic throat strap joins the ear pockets around the animal's throat. An elastic muzzle strap extends around the animal's muzzle and is joined to the crown strap by an elastic center strap and to the throat strap by two non-elastic cheek straps. The pockets may be thermally insulating to protect the ears of newborn calves in cold weather.

6 Claims, 2 Drawing Sheets

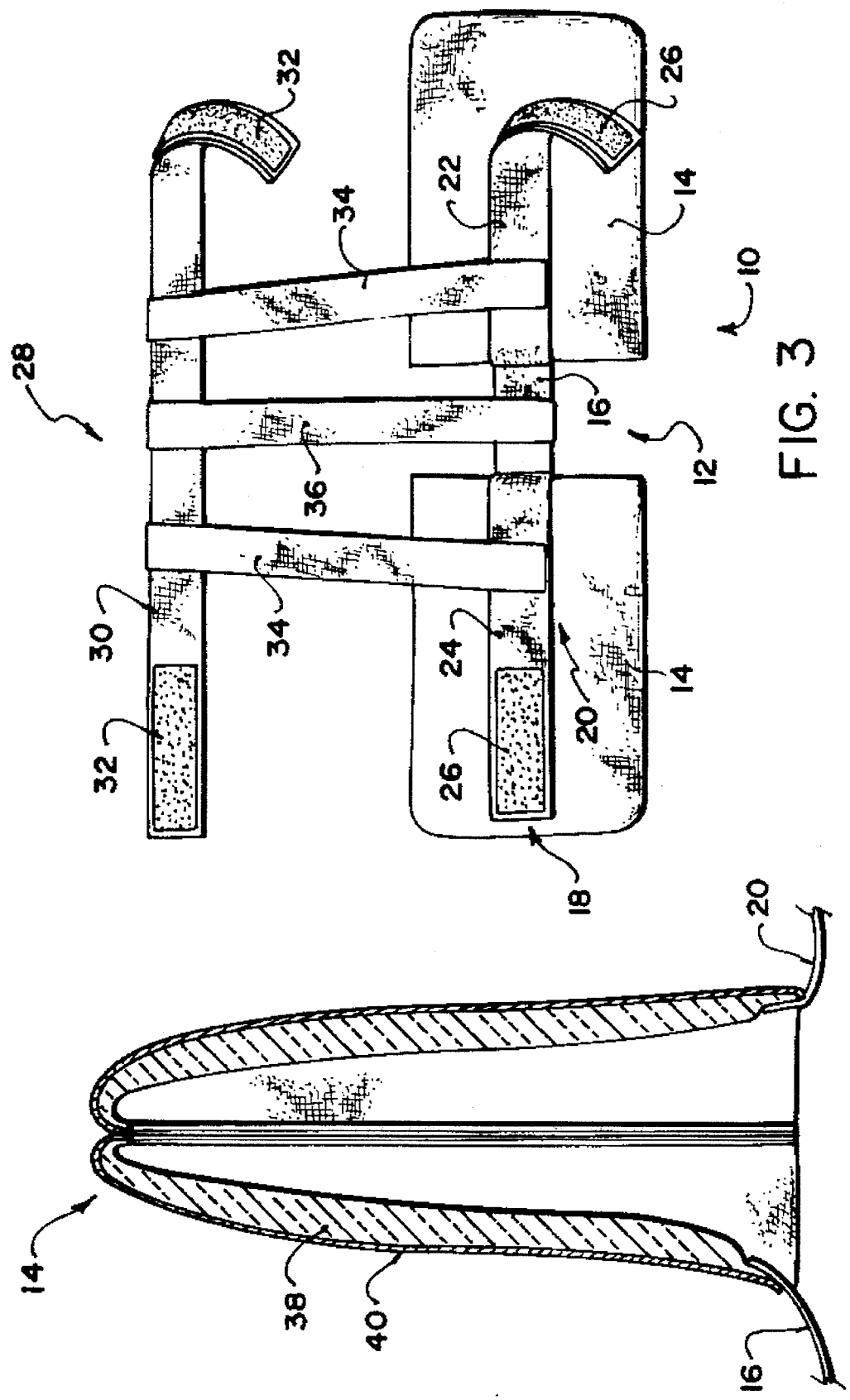

THERMALLY INSULATED CALF EAR PROTECTORS

FIELD OF THE INVENTION

The present invention relates to animal ear protectors.

BACKGROUND

In certain cases, it is desirable to protect the ears of an animal against damage. One specific instance is protecting the ears of newborn calves against freezing in cold weather. The ears are very thin, with little fur and are wet at birth. The mother cow will usually lick the calf to clean it, further wetting the ears so they are subject to severe frostbite. Other instances where ear protection is desirable will occur to those knowledgeable in the handling of animals.

With particular reference to calf ear protection, various attempts have been made, usually by individuals, to provide some sort of ear protection. None to date has proven fully satisfactory. One significant problem is holding the protection in place on the animals' ears. With a newborn calf, both the calf and the mother may make efforts to remove any ear protection.

The present invention aims at mitigating these problems.

SUMMARY

According to the present invention there is provided an animal ear protector comprising:
- a crown assembly including
  - two ear pockets,
  - crown means joining the ear pockets at a selected spacing for receiving the respective ears of the animal;
- a throat assembly including means for joining the ear pockets under the throat of the animal; and
- a muzzle assembly including muzzle encircling means connected to the crown and throat assemblies for encircling the muzzle of the animal.

The combination of the crown and throat assembly encircles the back of the head, while the muzzle assembly fastens the protector onto the muzzle of the animal. This holds the protector securely in place.

The throat assembly is preferably a throat strap extending from the two ear pockets and closed at the throat with a face to face fastener such as that sold under the trade mark VELCRO. The throat strap may be elastic to allow the strap to stretch and release if it is caught on some other object.

The muzzle assembly is preferably an elastic muzzle strap, closed with a face to face fastener and a centre strap extending from the muzzle strap to an elastic crown strap joining the two ear pockets. The muzzle strap is also connected to the throat strap by two cheek straps. The centre strap may be elastic, while the cheek straps are desirably non-elastic.

The elasticity of the muzzle strap allows it to be held securely in place, without hindering the animal's ability to eat or suckle in the case of a newborn calf. The elasticity of the centre strap, where used, provides for additional flexibility.

Where the protectors are to be used for cold weather ear protection, especially on newborn calves, the pockets include thermally insulating material. They are desirably covered with a water resistant material, that is a material that will allow water to run off or bead on the surface, with little absorption.

The invention will be described further in the following by way of example. It is to be understood that the invention is not limited to the specific example illustrated and described in the following.

BRIEF DESCRIPTION OF THE DRAWINGS

In the accompanying drawings, which illustrate an exemplary embodiment of the present invention:

FIG. 2 is a cross-section of an ear pocket; and

FIG. 3 is a view of the protector laid flat seen from the inside.

DETAILED DESCRIPTION

Figure 1:
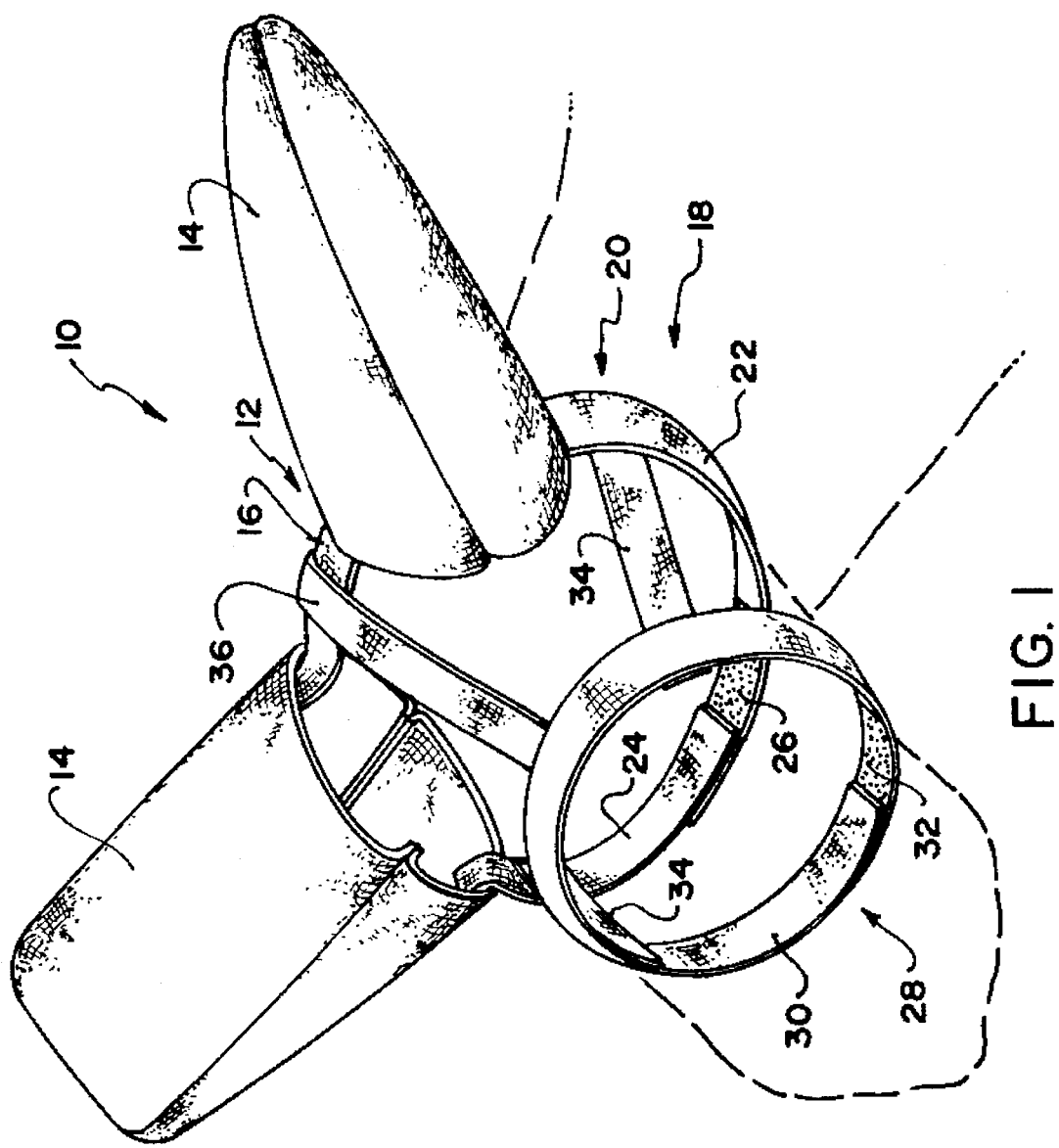
FIG. 1 is an isometric representation of an ear protector according to the present invention.

Referring to the accompanying drawings, there is illustrated an ear protector 10. This includes a crown assembly 12 with two ear pockets 14 joined by an elastic crown strap 16. A throat assembly 18 consists of a throat strap 20 with two strap components 22 and 24 and a face to face fastener 26 with components on the respective strap components so that the strap components can be connected in a closed loop of variable size simply by pressing the faces of the fastener components together. A fastener of this sort is commonly sold under the trade mark "VELCRO".

The protector includes a muzzle component 28. This includes a muzzle strap 30 with a two component face to face fastener 32 that is used to form the muzzle strap into a loop of variable size around the muzzle of the animal. The muzzle strap is elastic to accommodate muzzle movements of the animal and especially to allow the animal to eat or suckle in the case of a young animal. The muzzle strap 30 is connected to the respective throat strap components 22 and 24 by two non-elastic cheek straps 34. A centre strap 36 connects the centre of the muzzle strap 30 to the centre of the crown strap 16.

The protector is put on an animal by placing the crown strap 16 behind the head, with the pockets 14 over the ears. The throat strap is then closed at the throat of the animal and the muzzle component is pulled forward and the muzzle strap 30 fastened around the animal's muzzle. This securely fastens the protector to the animal's head.

The ear pockets 14 are generally rectangular in outline. As illustrated most particularly in FIG. 2, each pocket has a thermally insulating material 38 on the inside, covered with a water-resistant fabric cover 40. This is especially useful for cold weather protection of the ears of newborn calves.

The ear protector is adaptable to many different animals requiring ear protection for one purpose or another. Where the protection is not to be against freezing, the thermal insulation of the protector may be omitted. As will be apparent, different sizes of the protector will be required for animals of different sizes and with differently shaped heads. The throat and centre straps may be made of elastic material so that they will stretch with movements of the animal and will stretch and release when they are caught on an object. It is currently preferred to use non-elastic material for these straps.

Thus, while one particular embodiment of the invention has been described in detail, it is to be understood that other embodiments are possible within the scope of the invention. The invention is to be considered limited solely by the scope of the appended claims.

I claim:

1. An ear protector for a newborn calf comprising:
a crown assembly including:
   two ear pockets, each comprising a thermally insulating material with an outer cover layer of water resistant fabric;
   crown means consisting of a single elastic crown strap extending between and joining the ear pockets at a selected spacing for receiving the respective ears of the calf;
a throat assembly including:
   throat strap means for joining the ear pockets under the throat of the calf, said throat strap means comprising a throat strap secured at opposite ends thereof to the respective ear pockets at positions on the pockets opposite the crown strap for extending around the throat of the calf; and
   throat strap fastening means for selectively opening and closing the throats strap;
a muzzle assembly including:
   muzzle encircling means for encircling the muzzle of the calf, the muzzle encircling means comprising:
   an elastically stretchable muzzle strap, and muzzle strap fastening means for connecting the muzzle strap into a closed loop; and
   a plurality of additional straps joining the muzzle strap to the crown and throat assemblies, including:
   two non-elastic cheek straps joining the muzzle strap to the throat strap, and
   an elastic centre strap secured to the muzzle strap, between the cheek straps and secured to the crown strap, between the ear pockets.

2. A protector according to claim 1 wherein the throat strap comprises two throat strap components extending from respective ones of the ear pockets, and the throat strap fastening means comprise means for joining the throat strap components to provide a range of throat strap lengths.

3. A protector according to claim 2 wherein the throat strap is elastically stretchable.

4. A protector according to claim 1 wherein the throat strap fastening means comprise a face to face fastener means.

5. A protector according to claim 1 wherein the muzzle strap fastening means comprise a face to face fastener.

6. A protector according to claim 1 where the throat strap is elastically stretchable.

* * * * *